Patented Dec. 31, 1929

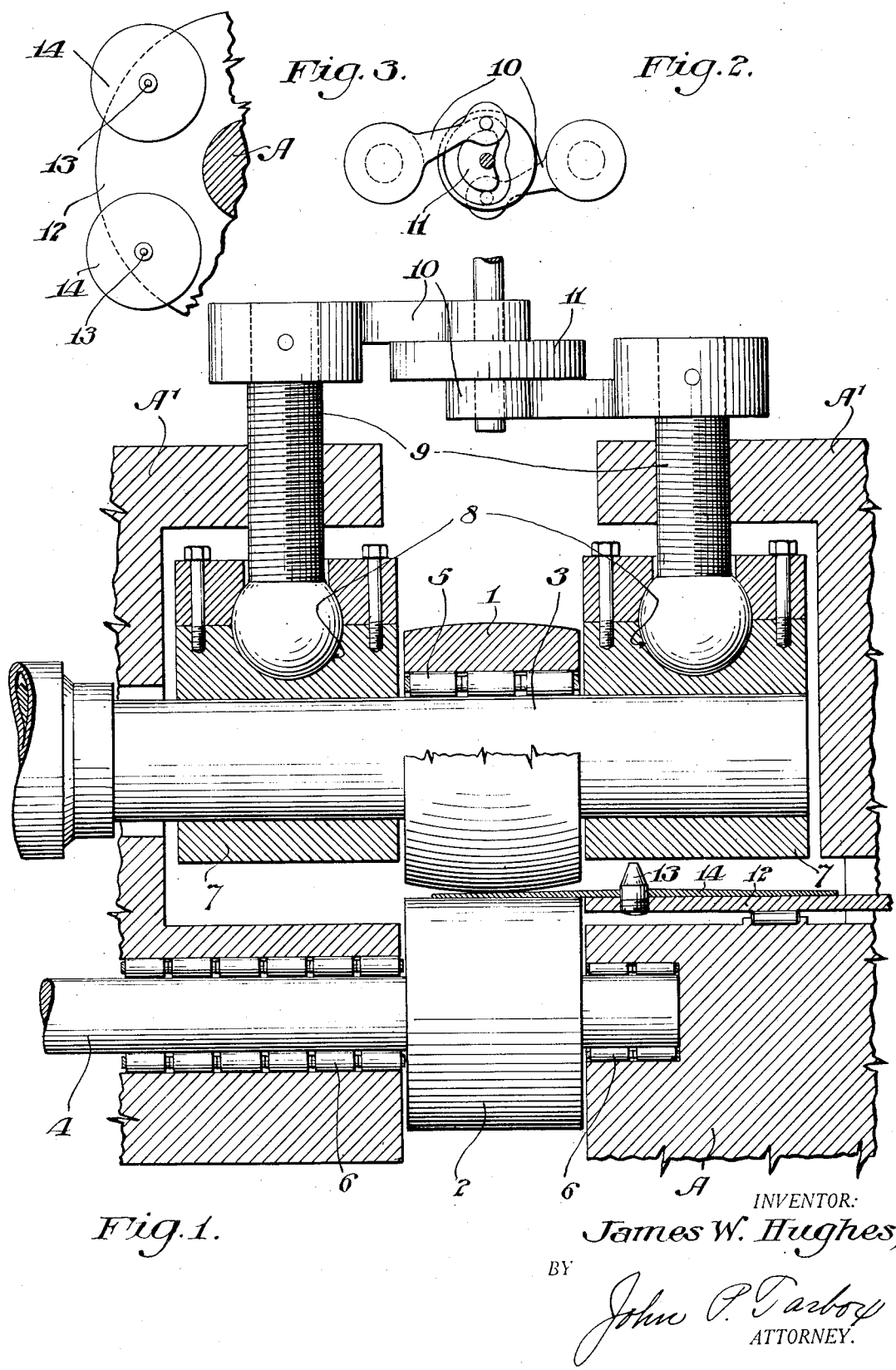
Dec. 31, 1929.  J. W. HUGHES  1,741,715
DISK ROLLING MILL
Filed Nov. 3, 1926
INVENTOR:
James W. Hughes,
BY
John P. Tarboy
ATTORNEY.

1,741,715

UNITED STATES PATENT OFFICE

JAMES W. HUGHES, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

DISK-ROLLING MILL

Application filed November 3, 1926. Serial No. 145,936.

This invention has for its object the provision of a machine wherein disks of irregular cross-section may be formed. This irregularity may be in the form of a taper, inward or outward, or may be of other orders, producing radial ribs, or grooves, or circumferential and intermediate ribs or grooves. The invention also aims to avoid the slipping and buckling effects common to the rolling of such shapes.

The apparatus will be described by reference to the accompanying drawings substantially diagrammatic in nature in which:

Fig. 1 is a section through the roll centers,

Fig. 2 is a partial view of Fig. 1, from above, to a smaller scale,

Fig. 3 is a partial view of the work-supporting turret, from above.

The machine by which the objects of the invention are accomplished comprises a pair of rolls of suitable contour to permit a relative angular adjustment of their axes while maintaining contact on the piece being rolled substantially at a point, or on a small area.

The drawings illustrate diagrammatically only those parts of a preferred form of the device which are pertinent to the invention.

The frame A of the illustrative machine, comprises side portions adapted to resist the separational forces produced by the pressure of rolling. At the upper ends of these side portions are projecting lugs A', provided for a purpose to be explained later. In the "gap" between the sides and under the projections A' rolls 1 and 2 are seated.

In accordance with the invention, one of these rolls, the lower roll 2, is of a plain cylindrical shape, while the other, upper roll 1, is formed with a curved face, giving the roll a barrel-like appearance. This latter roll will hereinafter be referred to as a "barrel-shaped" roll.

The aforesaid roll 2 is mounted on a shaft 4 and arranged to rotate therewith. Suitable anti-friction bearings 6, of any well-known heavy-duty type, are provided to decrease friction and permit rotation of roll 2 and shaft 4 in the frame A. Any suitable means may be provided to drive the shaft 4.

The barrel-shaped roll 1 is mounted on a shaft 3 and rotates freely thereon, due to the bearing 5, of the same type as mentioned above. The shaft 5 is fixed in blocks 7.

The blocks 7 are supported universally by engagement of ball-ended screws, 9, in spherical cavities, 8, of said blocks. The screws 9 engage correspondingly threaded bores in the projections A' of the frame, and thus provide the means for the relative angular adjustment of the roll axes, mentioned above. The said screws are threaded left and right hand and are adapted for operation by cam 11 through the cam follower levers 10 attached to their projecting ends.

The cam 11 derives its movement from any suitable source of power. For example, in repetition work, where large quantities of duplicate parts are to be made, the cam may be geared to the roll shafts 3, 4, or to the motive agent therefor.

The cam shown is of a conformation to produce a disk which is tapered from a point near the center, to its periphery, Fig. 1 illustrates the apparatus in mid-cycle. Further rotation of the cam in a counter-clockwise direction (as shown in Fig. 2) will cause first, a depression of the left end of the roll 1, then a raising thereof, followed by a raising of the right end of the roll. At this latter point, which will be 270° (in a counter-clockwise direction, Fig. 2) from that shown, the rolls 1 and 2 are separated, and the machine ready for the removal of the rolled disk and the insertion of a blank for the next rolling operation.

To facilitate such removal and insertion, a turn-table 12 is provided which is rotatable about a portion of the frame A as shown. Carried on said turn-table, or turret, are pilot pins 13, which serve to locate and retain the blanks or finished disks, designated generally by 14, on the turn-table. Rotation of said table, by any suitable means, serves to position blanks between the rolls and remove them therefrom. In accordance with the above arrangement for operation of the cam 11, the turret 12 may be synchronized therewith, thus providing a fully automatic machine.

The apparatus operates as follows:

Assuming that the cam 11, is in the position described above, 270° from that shown, so that both ends of the barrel-shaped roll are raised from the lower roll, and that the lower roll is in rotation by means of some suitable source of power; a blank 14, is placed on a turn-table pin 13 and the turn-table rotated to bring said blank between the rolls. Thereafter, first the right-hand end of the barrel-shaped roll, next, the left, is brought down to the blank and forcibly pressed thereagainst, either automatically, or manually, by rotation of the cam in a counter-clockwise direction. This causes a tilting of the barrel-shaped roll with respect to the cylindrical roll, and a consequent progression of the point of rolling contact from a point near the center to the periphery of the blank. Following this the rolling pressure is relieved by the raising, first, of the left-hand end, then the right of the barrel shaped roll. The rolled disk is removed and the machine is ready for a repetition of the operation.

The above mode of operation produces a uniformly tapered disk. Obviously, by introducing minor variations in the general type of cam path shown, other shapes may be rolled. A recurrent variation, timed to produce a slight lift of the barrel-shaped roll, say six times per revolution of the disk, would effect a correspondingly "spoked" or radially ribbed formation of the disk. A lift of the same roll during several turns of the disk and recurring at equal intervals, would result in concentric ribs, or a corrugated effect. It may readily be seen therefore, that, although the invention has been described in relation to tapered disks, they comprise by no means the sole product possible thereto.

Furthermore, since the rolling action is confined to a very small area, substantially a geometric point, there is no tendency for the rolls to "slip" on the blank due to the varying peripheral speeds, at different radii thereof. Nor, due to this same local working, is there any tendency toward buckling, since opportunity is given for gradual and easy displacement of the metal.

Another point of advantage consists in the particular fitness of this type of mill for hot rolling operations, due to this same feature of a small area of contact and consequently, a low rate of heat transmission.

Obviously, the invention may assume and include forms other than that disclosed and hence has a scope determined by the appended claims.

What I claim is:—

1. A rolling mill for rolling disks comprising opposed rolls, supports for said rolls, and means for relatively moving said supports to cause relative tilting movements and separational and approach movements between said rolls in an automatic cycle, and a support for the work permitting rotation of the work under the action of the rolls.

2. In a rolling mill for rolling disks including a pair of rolls, means for obtaining relative angular adjustment of the rolls comprising universally supported bearings for one of said rolls and automatically operative means to cause adjustment of said bearings relative to the other roll and independently of each other.

3. A rolling mill for rolling disks comprising opposed rolls, supports for the rolls having relative tilting, approach and separational movements and cam means for causing said movements to recur in a predetermined cycle.

4. A rolling mill for rolling disks comprising relatively adjustable rolls, and means for causing said relative adjustment including universally supported bearings for one of said rolls, means for causing independent movements of said bearings and means for automatically actuating said last named means in a predetermined cycle.

In testimony whereof he hereunto affixes his signature.

JAMES W. HUGHES.